United States Patent [19]

Bourigault

[11] Patent Number: 5,161,894
[45] Date of Patent: Nov. 10, 1992

[54] TEMPERATURE-SENSITIVE ELEMENT AND A MEASUREMENT PROBE INCLUDING SUCH AN ELEMENT

[75] Inventor: Raymond Bourigault, Paris, France

[73] Assignee: Materiel et Auxiliaire de Signalisation et de Controle pour l'Automation-Auxitrol, Asnieres, France

[21] Appl. No.: 664,190

[22] Filed: Mar. 4, 1991

[30] Foreign Application Priority Data

Mar. 6, 1990 [FR] France .................. 90 02800

[51] Int. Cl.$^5$ .................. G01K 7/18; G01K 13/02
[52] U.S. Cl. .................. 374/185; 374/208; 374/135; 338/28
[58] Field of Search ............... 374/179, 140, 208, 135, 374/138, 185; 136/230, 232, 233, 234, 242; 73/204.21; 338/28

[56] References Cited

U.S. PATENT DOCUMENTS

| | | | |
|---|---|---|---|
| 2,517,053 | 8/1950 | Thompson | 136/233 |
| 2,588,014 | 3/1952 | Knudsen | 374/185 |
| 2,753,714 | 7/1956 | Perkins et al. | 374/185 |
| 2,971,997 | 2/1961 | Carrico | 374/138 |
| 3,153,769 | 10/1964 | Moses | 374/185 |
| 3,232,794 | 2/1966 | Korton | 374/179 |
| 3,283,580 | 11/1966 | Nanigian et al. | 136/230 |
| 3,339,164 | 8/1967 | Landis et al. | 338/28 |
| 3,537,911 | 11/1970 | Hynd | 136/242 |
| 3,738,172 | 6/1973 | Sato | 338/28 |
| 3,791,209 | 2/1974 | Norburn | 136/234 |
| 3,811,958 | 5/1974 | Maurer | 136/233 |
| 3,893,058 | 7/1975 | Keith | 338/28 |
| 4,018,624 | 4/1977 | Rizzolo | 374/179 |
| 4,138,655 | 2/1979 | Nakano et al. | 338/28 |
| 4,217,463 | 8/1980 | Swearingen | 374/179 |
| 4,625,200 | 11/1986 | Hilborn et al. | 374/179 |
| 4,934,831 | 6/1990 | Volbrecht | 374/179 |
| 5,088,837 | 2/1992 | Shiokawa et al. | 374/185 |

FOREIGN PATENT DOCUMENTS

| | | | |
|---|---|---|---|
| 0536448 | 1/1959 | Belgium | 374/185 |
| 0153661 | 9/1985 | European Pat. Off. | 374/138 |
| 0031154 | 1/1961 | Finland | 338/28 |
| 858810 | 12/1940 | France . | |
| 884741 | 8/1943 | France . | |
| 1042744 | 11/1953 | France | 338/28 |
| 1294690 | of 1962 | France . | |
| 1566141 | 5/1969 | France . | |
| 4680018 | 12/1951 | Italy | 338/28 |
| 57-56728 | 5/1982 | Japan . | |
| 0080021 | 4/1986 | Japan | 374/138 |
| 0734702 | 8/1955 | United Kingdom | 374/148 |
| 0735164 | 8/1955 | United Kingdom | 338/28 |
| 1454816 | 11/1976 | United Kingdom | 338/28 |

OTHER PUBLICATIONS

NASA Industrial Applications Flash Sheet M-F-S-12165, Benson A. S., (Dec. 1971).
Article from Technisches Messen, vol. 54, No. 4, (1987) pp. 130-140 by H. J. A. Klappe entitled "Platin-Widerstandstherometer fur industrielle Anwendungen".

*Primary Examiner*—William A. Cuchlinski, Jr.
*Assistant Examiner*—Diego F. F. Gutierrez

[57] ABSTRACT

A temperature-sensitive element including an elongate ceramic mandrel having at least two non-insulated connection wires passing longitudinally therealong, which wires are connected to a bifilar winding wound over the outside surface of said mandrel, and an insulated coating of glass surrounding the elongate mandrel and its bifilar winding, the temperature-sensitive element being characterized by the fact that it includes at least one mineral-insulated screened cable having one end received inside the elongate mandrel, with the connection wires passing along the cable(s), and by the fact that the insulated covering also covers that zone of the mineral insulated-screened cable(s) which is immediately adjacent to the point where the cable(s) penetrates into said elongate mandrel. The invention is particularly suitable for measuring temperatures in the field of cryogenics and in the aerospace industry.

15 Claims, 2 Drawing Sheets

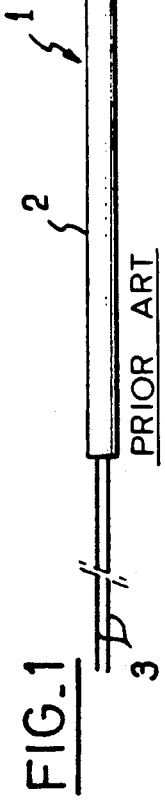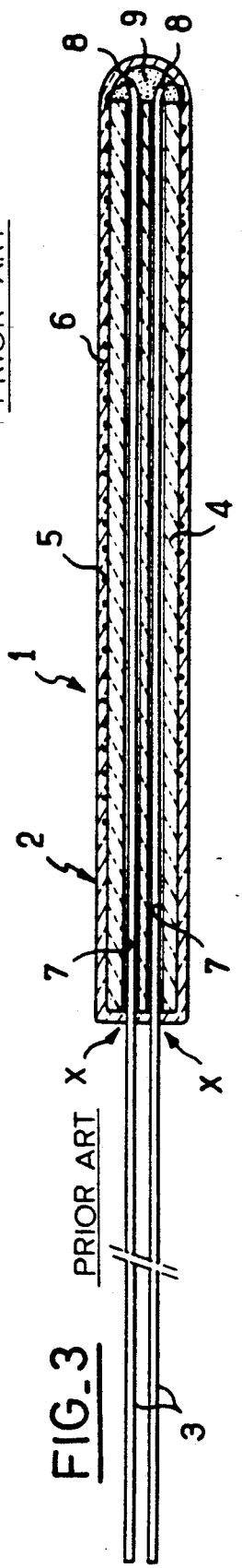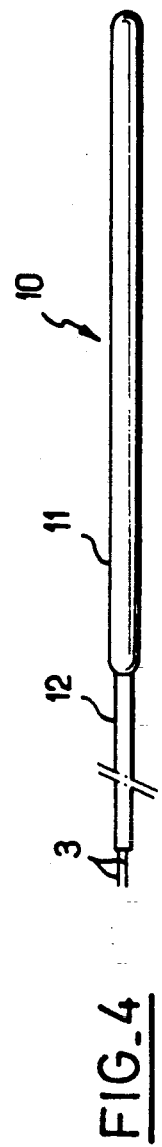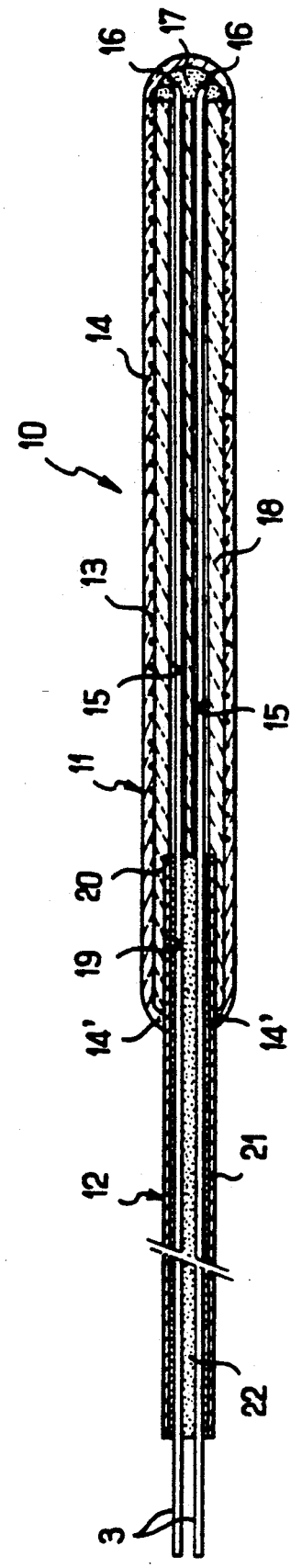

TEMPERATURE-SENSITIVE ELEMENT AND A MEASUREMENT PROBE INCLUDING SUCH AN ELEMENT

BACKGROUND OF THE INVENTION

The present invention relates to temperature-sensitive elements, and more particularly to elements suitable for use in making measurement probes capable of accurately determining the temperature of a fluid by measuring the electrical resistance of a coiled winding.

Such temperature-sensitive elements must be capable of operating over very wide temperature ranges (e.g. −250° C. to +700° C.) and/or in aggressive environments, while withstanding shock, vibration, pressure, and flow forces as well as possible. This applies in particular for space applications where measurement probes are used for determining the temperature of a flow of liquid hydrogen, or of liquid oxygen, or of any other liquefied gas.

The designers of such temperature-sensitive elements must thus cope with very difficult problems concerning insulation and mechanical strength. In addition, they seek to provide elements having response times which are as short as possible (e.g. less than 1 second), both for a rise and for a fall in temperature. Added to that is the need to be able to provide elements which are small in size, i.e. a few centimeters long and a few millimeters in diameter, thus making the problems to be solved even more difficult.

The state of the art is illustrated by temperature-sensitive elements of the type comprising an elongate ceramic mandrel along which at least two non-insulated connection wires (generally made of platinum) pass longitudinally and connect with a bifilar winding wound on the outside surface of said mandrel, with an insulating coating of glass surrounding the elongate mandrel and its bifilar winding.

Such temperature-sensitive elements are widely used, but they are nevertheless very vulnerable where the bare connection wires leave the insulating covering.

Proposals have been made to improve the installation of the bare platinum wires for the purpose of protecting them, by covering them with an insulating sheath of plastic material, e.g. polytetrafluoroethylene.

In addition to the temperature limitations of such a system (in general −50° C. to +300° C.), a major drawback remains in any event due to the presence of exposed zones of the connection wires where they leave the insulating coating, between the end edge of said coating and the edge of the protective sheaths.

There is always a "plane of weakness" at these exit points with a danger of breakage due to this zone being fragile and possibly being subjected to severe mechanical stresses (shock, vibration, pressure, flow forces), with the work hardening of the wires in any event deteriorating their electrical characteristics by modifying their resistivity. Naturally, these risks become even worse when the temperature-sensitive element is immersed in a conducting atmosphere.

SUMMARY OF THE INVENTION

The object of the invention is to improve temperature-sensitive elements of the above-mentioned type by insulating the exit points of the wires and by making them mechanically stronger.

Another object of the invention is to provide a temperature-sensitive element capable of operating over wide temperature ranges without suffering from vulnerability of zones of weakness, and having a very short response time, associated with dynamic behavior enabling it to be used under severe conditions, both at low temperatures (e.g. in space applications) and at very high temperatures.

The present invention provides a temperature-sensitive element including an elongate ceramic mandrel having at least two non-insulated connection wires passing longitudinally therealong, which wires are connected to a bifilar winding wound over the outside surface of said mandrel, and an insulated coating of glass surrounding the elongate mandrel and its bifilar winding, the temperature-sensitive element being characterized by the fact that it includes at least one mineral-insulated screened cable having one end received inside the elongate mandrel, with the connection wires passing along the cable(s), and by the fact that the insulating covering also covers that zone of the mineral-insulated screened cable(s) which is immediately adjacent to the point where the cable(s) penetrates into said elongate mandrel.

In a particular embodiment, the elongate ceramic mandrel has at least one deep bore for receiving the mineral-insulated screened cable(s); in particular, the depth of the deep bore in the elongate mandrel is not less than twice the outside diameter of a mineral-insulated screened cable. It is then preferable for the end(s) of the mineral-insulated screened cable(s) received in the deep bore in the elongate mandrel to be sealed therein.

Advantageously, the, or each, mineral-insulated screened cable is essentially constituted by a metal sheath enclosing insulation such as magnesia or alumina, with the associated connection wire(s) being embedded therein. In particular, the sheath of the, or each, mineral-insulated screened cable is made of a metal or a metal alloy having a thermal expansion coefficient close to that of the ceramic constituting the elongate mandrel and also close to that of the glass insulating coating of the temperature-sensitive element.

The invention also provides a measurement probe including a temperature-sensitive element of the above-specified type, characterized by the fact that it has a main body with a perforated tubular extension, said body supporting the temperature-sensitive element by a spacer through which the, or each, mineral-insulated screened cable of the said element passes, in such a manner that the coated bifilar winding is disposed inside said perforated tubular extension.

Advantageously, the measurement probe further includes two resilient centering pads for holding the portion of the temperature-sensitive element disposed inside the perforated tubular extension, with a first one of said pads having the, or each, mineral-insulated screened cable passing therethrough being disposed between the spacer and the adjacent end of the insulating coating of said portion, and with a second one of said pads being interposed between the other end of said insulating coating and the end of said tubular extension.

It is then preferable for clearance to be provided where the mineral-insulated screened cable(s) passes through the first pad in order to allow the temperature-sensitive element a degree of freedom in bending.

Advantageously, the main body has a central bore extending the bore of the perforated tubular extension, said bore receiving the spacer and the first centering pad.

In a preferred embodiment, a rigid sealed connection preferably provided by brazing or soldering is provided between the spacer and the screening of the mineral-insulated screened cable(s), and between the said spacer and the main body. Also preferably, the spacer is made of metal, whereas the resilient centering pads are made of plastic, e.g. polytetrafluoroethylene.

According to another advantageous characteristic, the central bore of the main body opens out at its end furthest from the perforated tubular extension in a chamber which receives the ends of the connection wires, said chamber being closed in sealed manner by a sealed connector to which the said ends are connected; in particular, the chamber of the main body receives a compound in which the connections at the ends of the connection wires are embedded.

BRIEF DESCRIPTION OF THE DRAWINGS

Other characteristics and advantages of the invention appear more clearly in the light of the following description of a particular embodiment of the invention made with reference to the accompanying drawings, in which:

FIG. 1 is an elevation view of a prior art temperature-sensitive element having two connection wires;

FIG. 2 is a partially cutaway perspective view of the same prior art element showing up the bifilar winding which is wound around the central ceramic mandrel;

FIG. 3 is a longitudinal section view through the same element showing up more clearly the plane zones of weakness (reference X) mentioned above;

FIG. 4 is an elevation view of a temperature-sensitive element made in accordance with the invention, having a single mineral-insulated screened cable conveying two connection wires, with this view being analogous to that of FIG. 1;

FIG. 5 is a longitudinal section through the FIG. 4 element, showing up its structure more clearly, in particular the covering of that zone of the mineral-insulated screened cable which is immediately adjacent to the point where the cable is received in the ceramic mandrel.

DETAILED DESCRIPTION OF THE DRAWINGS

Figure 6:
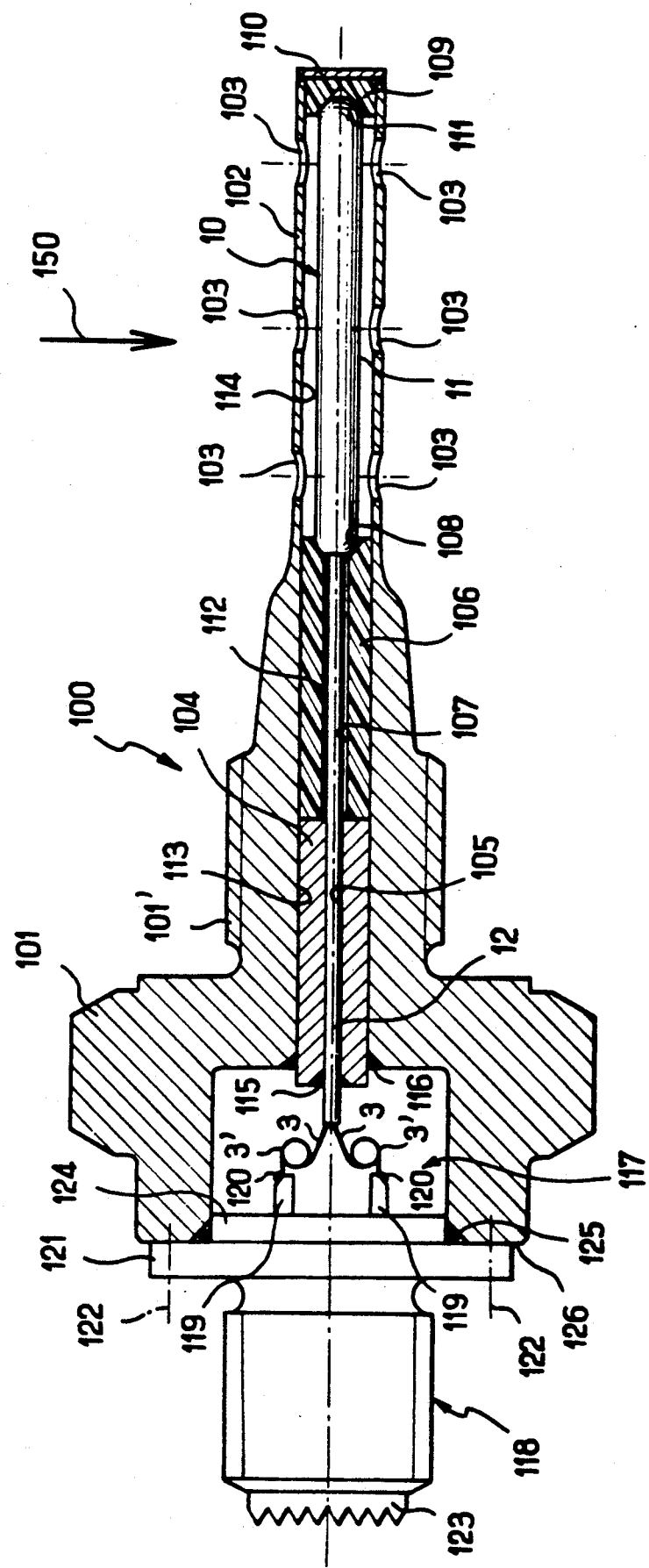
FIG. 6 is a section view through a measurement probe in accordance with another aspect of the invention, the probe containing a temperature-sensitive element and the view serving to show up the structure of the probe, and in particular its means for supporting and positioning in the said temperature element.

FIGS. 1 to 3 show a prior art temperature-sensitive element which in this case has two connection wires (there also exist similar elements having three or four connection wires, but the operating principle is identical).

The element 1 is in the form of an elongate body 2 having two wires 3 leaving the body, which wires are connection wires for a bifilar winding inside the said elongate body.

FIG. 2 shows an elongate ceramic mandrel 4 along which the two non-insulated connection wires 3 (generally made of platinum) pass longitudinally to connect with a bifilar winding 5 which is likewise made of platinum wire. The bifilar winding is wound on the outside surface of the mandrel 4 with two non-touching turns being wound simultaneously so as to provide both the inlet and the outlet of said winding at the same end of said element, and leaving a loop 5' at the other end of the bifilar winding.

An insulating coating of glass 6 covers the elongate mandrel 4 and its bifilar winding 5 in order to hold the wire in place and to seal the element from the outside.

The structure of this prior art temperature-sensitive element is more clearly visible in the section of FIG. 3.

In this figure it can be seen that the elongate ceramic mandrel 4 has two longitudinal channels 7 along which the non-insulated platinum connection wires 3 pass.

The connection wires 3 project beyond one end of the elongate mandrel 4 where they are connected to the bifilar winding 5 which is wound over the outside surface of the mandrel by arc welding or by soldering 8.

By way of numerical example, the diameter of the non-insulated platinum wires 3 is about one or two tenths of a millimeter and the bifilar winding is made of platinum wire having a diameter of about one hundredth of a millimeter.

An insulating plug 9 is provided over the connections 8 in order to provide a mechanical connection between the wires at the end of the temperature-sensitive element.

The insulating glass coating 6 is provided over the elongate mandrel and the bifilar winding, with this insulating covering thus serving simultaneously to hold the wires in place and to seal the element from the outside.

FIG. 3 clearly shows the exit zones of the connection wires 3 where they leave the elongate ceramic sleeve 4, and where the insulating coating overlies the bare platinum wires directly.

These two zones are marked X in FIG. 3 and together they constitute the above-mentioned "plane of weakness" where the main drawbacks described above are concentrated (mechanical fragility of the wires, with the risk of breakage and of deteriorating electrical characteristics, and also vulnerability to the outside atmosphere).

FIGS. 4 and 5 show a temperature-sensitive element made in accordance with the invention.

With reference to FIG. 4, it can be seen that the element 10 is in the form of an elongate body 11 externally similar to the elongate body of the above-described prior art element except insofar as the present elongate body is extended by a single mineral-insulated screened cable 12 from which the two connection wires 3 exit. As explained below, an element in accordance with the present invention may include a single mineral-insulated screened cable along which both of the connection wires pass (or in general all three or all four of them), or else it may include a plurality of mineral-insulated screened cables each having one connection wire passing therealong.

The structure of the element 10 can be seen more clearly in the section of FIG. 5.

The element 10 is somewhat similar in structure to the above-described element 1 in that it likewise comprises an elongate ceramic mandrel 18 along which the non-insulated connection wires 3 pass longitudinally and connect with a bifilar winding 13 which is wound on the outside surface of said mandrel. Similarly there are welds or solder connections 16 between the connection wires 3 and the bifilar winding 13, together with an insulating plug 17 protecting the connection zone. The leading end of the element 10, i.e. its portion corresponding to the connection with the bifilar winding 13 also includes an insulating glass coating 14 surrounding the elongate mandrel and its bifilar winding.

The connection wires 3 and the wires of the bifilar winding 13 may be made of platinum, an alloy of platinum and rhodium or of platinum and palladium, or of any other suitable metal alloy (e.g. a silver alloy or a nickel alloy).

However, in this case and in accordance with an essential characteristics of the invention, the element 10 includes a mineral-insulated screened cable 12 with one end received inside the elongate ceramic mandrel 18 and with the connection wires 3 passing inside the cable, and in addition the insulating coating 14 also covers that portion of the mineral-insulated screened cable 12 which is immediately adjacent to the point where the cable is received inside the said elongate mandrel.

The extent to which the mineral-insulated screened cable 12 is received inside the elongate ceramic mandrel 18 is not critical for the invention: it may be received in a central bore of the mandrel 8 and extending along the entire length thereof or, as shown in FIG. 5, it may be received in a deep bore 19 so as to be received in one end of the elongate mandrel 18.

Although it is easier for the cable to extend along the entire length of the elongate mandrel 18 since there is then no need to machine a deep bore in one end of the mandrel, the response time of such an element will necessarily be longer. Thus, the person skilled in the art will choose the extent to which the cable is received in the mandrel as a function of the priorities concerned, with full length insertion of the end of the mineral-insulated screened cable 12 providing greater resistance to shock and vibration but also giving response characteristics which are considerably less advantageous than when received in a deep bore at one end only.

As shown in FIG. 5, the elongate ceramic mandrel 18 has a deep bore 19 whose depth is sufficient to provide good fatigue performance: the depth of the deep bore 19 should preferably be not less than twice the outside diameter of the mineral-insulated screened cable 12.

The end of the mineral-insulated screened cable 12 thus extends as far as a shoulder 20 of the deep bore 19, and it is advantageous to provide a sealed connection in said deep bore, e.g. by means of glue based on special glass or by means of any other appropriate cement.

The connection wires 3 thus pass along the mineral-insulated screened cable 12 and leave the cable to penetrate into two elongate channels 15 in the ceramic mandrel 18, which channels are analogous to the channels 7 in the above-described prior art element.

It is important to observe that the insulating coating 14 extends rearwards in the form of a portion 14' which also covers that zone of the mineral-insulated screened cable 12 which is immediately adjacent to the point at which it penetrates into the elongate mandrel 18.

This ensures extremely satisfactory insulation for the element 10 at the exit point of the connection wires 13, while also providing very advantageous mechanical performance for the wires at this point.

The insulating coating 14 is made of special glass from a mass melted at high temperature, with the melting point of the glass naturally being higher than the maximum operating temperature of the temperature-sensitive element.

The length of the mineral-insulated screened cable 12 extending beyond the insulating coating 14 may, theoretically, be very long, i.e. more than several meters long. In practice, this length is selected as a function of the way in which the temperature-sensitive element is mounted, and an example is shown in FIG. 6 which shows the element mounted in a measurement probe.

The mineral-insulated screened cable 12 is preferably essentially constituted by a metal sheath 21 enclosing insulating material 22 such as magnesia, alumina, or any other insulating material with the connection wires 3 being embedded therein.

Such a mineral-insulated screened cable is preferably manufactured using the cold swaging technique: in this technique, a plurality of beads of the selected insulating material (such as magnesia or alumina, for example), are threaded over the connection wires 3, after which the assembly is inserted in a metal tube (which is to constitute the sheath of the final cable), with the metal tube then being subjected to cold working having the effect of reducing the beads threaded over the connection wires to powder, and thereby forming an agglomerated cylinder of insulated material within which the said connection wires are embedded.

It may be observed that the mineral-insulated screened cable behaves like a cantilevered beam, having a contain degree of freedom in bending, while nevertheless protecting the connection wires it contains.

This prevents any risk of the connection wires 3 being work hardened where they leave the ceramic mandrel, and this constitutes a very significant advantage over the prior art.

The sheath 21 of the mineral-insulated screened cable 12 is preferably made of a metal or a metal alloy whose coefficient of thermal expansion is close to that of the ceramic constituting the elongate mandrel 18, and is also close to that of the glass constituting the insulating coating 14. A ferro-nickel sheath could be used, for example.

By way of numerical example, the mineral-insulated screened cable 12 could have an outside diameter of about 1 millimeter.

This form of temperature-sensitive element 10 may be manufactured using the following steps:

the mineral-insulated screened cable 12 is made with the leading ends of the connection wires 3 projecting therefrom;

the end of the mineral-insulated screened cable 12 is inserted into the deep bore 19 until it comes into abutment against the shoulder 20 thereof;

the cable is sealed in the bore;

the bifilar winding is put into place on the outside surface of the ceramic mandrel 18;

the electrical connections 16 are made;

the insulating plug 17 is formed over the said connections 16; and the insulating glass coating 14 is formed, with the rear portion 14' thereof overlying the zone of the mineral-insulated screened cable which is immediately adjacent to the point where it is received in the elongate mandrel 18.

As mentioned above, it is possible to have more than two connection wires 3 passing along the mineral-insulated screened cable 12, i.e. there are generally three or four such wires, with the mandrel 18 having a corresponding number of channels 15 and with the wires being connected at 16 in conventional manner to the bifilar winding 13.

It is also possible to provide a plurality of mineral-insulated screened cables 12 each having one or two connection wires 3, for example it will be possible to use two, three, or four screened cables each receiving a single connection wire. In this case, the mineral-insulated screened cables are all received in the elongate ceramic mandrel and the portion of the cables lying outside the insulating coating 14 may be twisted in order to constitute an outlet cord, and with the cables being received either in a single deep bore or else in respective individual bores.

The above-described temperature-sensitive element may be used in numerous applications, and the invention also extends to cover a particular measurement probe including such a temperature-sensitive element. One such measurement probe is now described with reference to FIG. 6.

In accordance with the invention, the measurement probe 100 including a temperature-sensitive element 10 as described above has a main body 101 with a perforated tubular extension 102, the said body supporting the temperature-sensitive element 10 via a spacer 104 through which the mineral-insulated screened cable 12 of the element passes (only one cable in this case), with the coated bifilar winding of the element being disposed in said perforated tubular extension.

The perforated tubular extension has a plurality of holes 103 allowing a surrounding fluid to flow over the outside surface of the elongate body 11 of the temperature-sensitive element 10.

The number of holes 103 is selected to be large enough to ensure that the fluid immerses the active portion of the temperature-sensitive element properly while avoiding the application of excessive bending forces to said element.

In this respect, however, it should be observed that means are provided for ensuring that the elongate body 11 of the temperature-sensitive element is accurately positioned both longitudinally and transversely, thereby obtaining highly favorable bending strength which makes it possible to operate with fluid flow velocities in the direction of arrow 150 that may be very high, e.g. 170 meters per second (m/s).

The measurement probe 100 thus includes two resilient centering pads for holding that portion 11 of the temperature-sensitive element which is disposed inside the perforated tubular extension 102.

There is a first pad 106 through which the mineral-insulated screened cable 12 of said element passes, the pad 106 being interposed between the spacer 104 and the adjacent end of the insulating coating of said portion 11.

The second pad 109 is interposed between the other end of the insulating coating and the end 110 of the tubular extension 102.

The main body 11 of the temperature-sensitive element 10 is aligned by providing a conical bearing surface 108 on the first pad 106 and a conical bearing surface 111 on the second pad 109.

This ensures that the temperature-sensitive element 10 is coaxially disposed inside the body of the probe.

As can be seen in FIG. 6, clearance 112 is provided around the mineral-insulated screened cable 12 where it passes through the first pad 106 so as to allow the temperature-sensitive element 10 a degree of freedom in bending without running the risk of breaking the insulating coating of the element.

This portion of the mineral-insulated screened cable 12 passing along the larger diameter central bore 107 through the pad 106 is thus free to deform in bending between its two ends neither of which is free to rotate.

In order to simplify assembly, it is advantageous for the main body 101 to have a central bore 113 extending the bore 114 of the perforated tubular extension 102, with said central bore 113 receiving the spacer 104 and the first centering pad 106.

The assembly is positioned, and sealing is provided by a rigid hermetically sealed connection, preferably obtained by brazing or soldering: thus, the spacer 104 is fixed to the sheath of the mineral-insulated screened cable 12 by a first fillet of brazing or soldering 115, and is fixed to the main body 101 by a second fillet of brazing or soldering 116.

For ease of assembly, it is advantageous for the second fillet 116 to have a melting point which is lower than the first fillet 115.

The spacer 104 is preferably a cylindrical metal tube whose central bore 105 receives the rear end of the mineral-insulated screened cable 12. The resilient centering pads 106 and 109 are preferably made of plastic material, e.g. polytetrafluoroethylene.

In the case mentioned above where the temperature-sensitive element includes a plurality of mineral-insulated screened cables, the outlet cord formed thereby passes freely through the larger diameter bore 107 of the first pad 106 and then passes through the bore 105 of the spacer 104, being finally fixed to said spacer by an overall plug of brazing or soldering 115 engaging the sheath of each of the mineral-insulated screened cables.

The end of the central bore 113 furthest from the perforated tubular extension 102 opens out into a chamber 117 of the body 101 which serves to receive the ends 3' of the connection wires 3.

This chamber is closed in sealed manner by a hermetically sealed connector 118 to which the ends 3' of the connection wires 3 are connected. The sealed connector 118 has connection stubs 119 each of which is brazed or soldered at 120 to the end 3' of the corresponding connection wire 3. The variant shown has two ends 3' since there are two connection wires 3. If the temperature-sensitive element has more than two connection wires 3, then there will be a corresponding number of connections 120 and stubs 119. Naturally, the ends 3' of the connection wires may be individually insulated, e.g. by means of coverings of polytetrafluoroethylene.

The sealed connector 118 includes a thrust flange 121 behind a centering ring 124 which penetrates into the chamber 117, said flange being screwed to the main body 101 of the probe as symbolized by axes 122 so as to bear against an annular facet 126 of the body 101.

A sealing O-ring 125 is disposed between the centering ring 124, the flange 121, and the body 101.

Finally, the rear portion of the sealed connector 118 has antirotation notches 123 for mounting on a moving connector (not shown), in conventional manner in this art.

The temperature-sensitive element 10 mounted in the measurement probe 100 is thus securely held in place both longitudinally and transversely. The bending freedom of the mineral-insulated screened cable(s) 12 inside the first pad 106 ensures that no dangerous bending forces arise at the exit point of the cable(s) from the insulating coating, which forces would run the risk of breaking the glass constituting said insulation.

It may be advantageous to provide for the chamber 117 of the main body 101 to receive an insulating compound in which the brazed or soldered connections 120 at the ends 3' of the connection wires are embedded.

Such a compound further improves the ability of these ends to withstand vibration. A conventional glue could be used, for example a glue of the type that takes a few minutes to polymerize in order to avoid complicating assembly operations.

The measurement probe 100 is easily assembled by performing the following succession of steps:

the first pad 106 is threaded over the mineral-insulated screened cable 12 (or the outlet cord if several mineral-insulated screened cables are used) of the temperature-sensitive element 10;

the metal spacer 104 is then threaded on;

the first brazed or soldered connection 115 is established between the spacer 104 and the screening of the mineral-insulated screened cable(s) 12;

the second pad 109 is disposed against the end 110 of the perforated tubular extension 102, after which the above subassembly is threaded through the central bore 113 of the main body 101;

the second brazed or soldered connection 116 is made to connect the subassembly to the body 101 and to provide sealing;

the sealed connector 118 is moved close to its final position so as to enable the brazed or soldered connections 120 to be established;

if a compound is provided in the chamber 117, it is put into place at this stage; and the sealed connector 118 is finally screwed to the main body 101 and the measurement probe 100 is then ready for use, said probe being screwed, for example, to an associated support (not shown) by means of a thread 101' on the main body 101.

The invention is not limited to the above-described embodiments, but on the contrary it covers any variant using equivalent means to reproduce the central characteristics specified in the claims.

I claim:

1. A temperature-sensitive element including an elongate ceramic mandrel having at least two non-insulated connection wires passing longitudinally therealong, which wires are connected to a bifilar winding wound over the outside surface of said mandrel, and an insulated coating of glass surrounding the elongate mandrel and its bifilar winding, said temperature-sensitive element including at least one mineral-insulated screened cable having one end received inside the elongate mandrel, with the connection wires passing along said at least one mineral-insulated screen cable, and by said insulating coating also covering that zone of said at least one mineral-insulated screened cable which is immediately adjacent to the point where said at least one mineral-insulated screened cable penetrates into said elongate mandrel, said elongate ceramic mandrel having at least one deep bore for receiving said at least one mineral-insulated screened cable, the depth of the deep bore in the elongate mandrel being not less than twice the outside diameter of said at least one mineral-insulated screened cable.

2. A temperature-sensitive element according to claim 1, wherein an end of said at least one mineral-insulated screened cable received in the deep bore in the elongate mandrel is sealed therein.

3. A temperature-sensitive element according to claim 2, wherein said at least one mineral-insulated screened cable is essentially constituted by a metal sheath enclosing insulation such as magnesia or alumina, with the associated connection wires being embedded therein.

4. A temperature-sensitive element according to claim 1, wherein said at least one mineral-insulated screened cable is essentially constituted by a metal sheath enclosing insulation such as magnesia or alumina, with the associated connection wires being embedded therein.

5. A temperature-sensitive element according to claim 4, wherein said sheath of said at least one mineral-insulated screened cable is made of a metal or a metal alloy having a thermal expansion coefficient close to that of the ceramic constituting the elongate mandrel and also close to that of the insulating coating.

6. A measurement probe including a temperature-sensitive element according to claim 1, wherein said measurement probe includes a main body with a perforated tubular extension, said body supporting the temperature-sensitive element by a spacer through which the mineral-insulated screened cable of said element passes, in such a manner that the coated bifilar winding is disposed inside said perforated tubular extension.

7. A measurement probe having a temperature-sensitive element including an elongate ceramic mandrel having at least two non-insulated connection wires passing longitudinally therealong, which wires are connected to a bifilar winding wound over the outside surface of said mandrel, and an insulated coating of glass surrounding the elongate mandrel and its bifilar winding, said temperature-sensitive element including at least one mineral-insulated screened cable having one end received inside the elongate mandrel, with the connection wires passing along said at least one mineral-insulated screen cable, and said insulating coating also covering that zone of said at least one mineral-insulated screened cable which is immediately adjacent to the point where said at least one mineral-insulated screened cable penetrates into said elongate mandrel wherein said measurement probe includes a main body with a perforated tubular extension, said body supporting the temperature-sensitive element by a spacer through which the mineral-insulated screened cable of said element passes, in such a manner that the coated bifilar winding is disposed inside said perforated tubular extension and wherein said measurement probe further includes two resilient centering pads for holding the portion of the temperature-sensitive element disposed inside the perforated tubular extension, with a first one of said pads having said at least one mineral-insulated screened cable passing therethrough being disposed between the spacer and an end of the insulated coating of said portion, and with a second one of said pads being interposed between the other end of said insulating coating and an end of said tubular extension.

8. A measurement probe according to claim 7, wherein clearance is provided where said at least one mineral-insulated screened cable passes through the first pad in order to allow the temperature-sensitive element a degree of freedom in bending.

9. A measurement probe according to claim 8, wherein the main body has a central bore extending the bore of the perforated tubular extension, said bore receiving a spacer and the first centering pad.

10. A measurement probe according to claim 9, wherein a rigid sealed connection, preferably provided by brazing or soldering, is provided between the spacer and the screening of said at least one mineral-screened cable, and between said spacer and said main body.

11. A measurement probe according to claim 10, wherein the spacer is made of metal, whereas the resilient centering pads are made of plastic.

12. A measurement probe as recited in claim 11, wherein said plastic is polytetrafluoroethylene.

13. A measurement probe according to claim 7, wherein the main body has a central bore extending the bore of the perforated tubular extension, said bore receiving a spacer and the first centering pad.

14. A measurement probe according to claim 13, wherein the central bore of the main body opens out at its end further from the perforated tubular extension in a chamber which receives the ends of the connection wires, said chamber being closed in sealed manner by a sealed connector to which the said ends are connected.

15. A measurement probe according to claim 14, wherein the chamber of the main body receives a compound in which the connections at the ends of the connection wires are embedded.

* * * * *